(12) United States Patent
Song

(10) Patent No.: US 11,858,397 B1
(45) Date of Patent: Jan. 2, 2024

(54) SEAT SUPPORT

(71) Applicant: Tao Song, Jiangxi (CN)

(72) Inventor: Tao Song, Jiangxi (CN)

( * ) Notice: Subject to any disclaimer, the term of this patent is extended or adjusted under 35 U.S.C. 154(b) by 0 days.

(21) Appl. No.: 18/099,239

(22) Filed: Jan. 19, 2023

(30) Foreign Application Priority Data

Sep. 20, 2022 (CN) .......................... 202222494353.4

(51) Int. Cl.
*B60N 2/90* (2018.01)
*B60N 2/60* (2006.01)

(52) U.S. Cl.
CPC ........... *B60N 2/995* (2018.02); *B60N 2/6027* (2013.01)

(58) Field of Classification Search
CPC .............................. B60N 2/995; B60N 2/6027
See application file for complete search history.

(56) References Cited

FOREIGN PATENT DOCUMENTS

| CN | 204037393 U | * | 12/2014 | |
|---|---|---|---|---|
| CN | 106696794 A | * | 5/2017 | |
| DE | 4238363 A1 | * | 5/1993 | ........... B60N 2/6027 |
| WO | WO-2015176130 A1 | * | 11/2015 | ............. B60N 2/995 |

* cited by examiner

*Primary Examiner* — Anthony D Barfield

(57) ABSTRACT

The present disclosure provides a seat support applied to a vehicle, the vehicle has a front seat assembly and a back seat assembly. The seat support includes a support member and a first connecting member. The support member includes a support portion arranged on the back seat assembly, and an anti-skid portion arranged on the support portion. The first connecting member is arranged on the support portion and configured to connect the support portion with the front seat assembly.

7 Claims, 20 Drawing Sheets

SEAT SUPPORT

CROSS REFERENCE TO RELATED APPLICATIONS

The present application claims the benefit of Chinese Patent Application No. 202222494353.4 filed on Sep. 20, 2022, the contents of which are incorporated herein by reference in their entirety.

FIELD

This present disclosure relates to supports, and in particular to a seat support for use in conjunction with seats during travel.

BACKGROUND

Travelling has become a very common part of life. People often travel for long periods during which time they are seated in a chair and are generally sedentary. In particular, travelling in airplanes requires a passenger to be seated in a cramped position for many hours; travelling in trains, buses and the like can further see a passenger seated for long periods of time in awkward and uncomfortable positions.

Sitting for long periods can become very uncomfortable and can lead to tired and aching muscles, swollen legs, deep vein thrombosis (DVT) and even the life threatening condition of pulmonary emboli. Furthermore, it can be difficult to sleep in an upright seated position and travelers can often become sleep deprived. All of these factors make travelling for long periods uncomfortable.

Accordingly, it would be advantageous of the present disclosure to provide a technical solution which ameliorates one or more of the disadvantages set forth above or at least provide the public with a useful choice.

SUMMARY

The present disclosure provides a seat support applied to a vehicle, the vehicle has a front seat assembly and a back seat assembly. The seat support includes a support member and a first connecting member. The support member includes a support portion arranged on the back seat assembly, and an anti-skid portion arranged on the support portion. The first connecting member is arranged on the support portion and configured to connect the support portion with the front seat assembly.

The present disclosure provides another seat support applied to a vehicle, the vehicle has a front seat assembly and a back seat assembly. The seat support includes a support member, a first connecting member, and a second connecting member. The support member includes a support portion arranged on the back seat assembly. The first connecting member is arranged on the support portion and configured to connect the support portion with the front seat assembly. The second connecting member is arranged on the support portion and configured to connect the support portion with the back seat assembly.

BRIEF DESCRIPTION OF THE DRAWINGS

Implementations of the present disclosure will now be described, by way of embodiment, with reference to the attached FIGS. It should be understood, the drawings are shown for illustrative purpose only, for ordinary person skilled in the art, other drawings obtained from these drawings without paying creative labor by an ordinary person skilled in the art should be within scope of the present disclosure.

Figure 1:
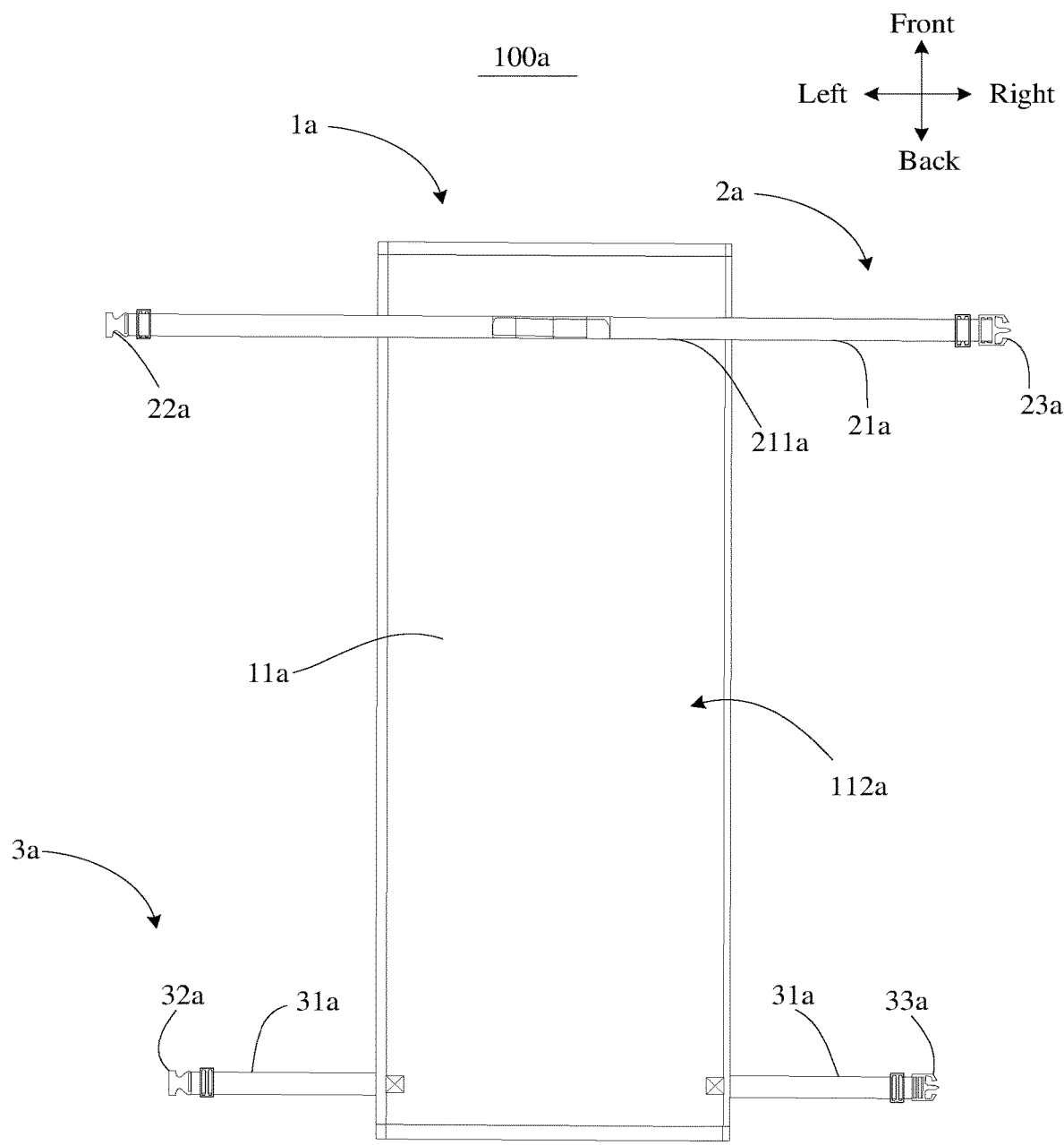
FIG. 1 is a structural diagram of a seat support according to a first embodiment of the present disclosure.

The realization of the aim, functional characteristics, advantages of the present disclosure are further described specifically with reference to the accompanying drawings and embodiments.

DETAILED DESCRIPTION

The technical solutions of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present invention without creative efforts shall fall within the protection scope of the present invention.

It is to be understood that, all of the directional instructions in the exemplary embodiments of the present disclosure (such as top, down, left, right, front, back) can only be configured to explaining relative position relations, moving condition of the elements under a special form (referring to FIGS.), and so on, if the special form changes, the directional instructions change accordingly.

In addition, the descriptions, such as the "first", the "second" in the present disclosure, can only be configured to describing the aim of description, and cannot be understood as indicating or suggesting relative importance or impliedly indicating the number of the indicated technical character. Therefore, the character indicated by the "first", the "second" can express or impliedly include at least one character. In addition, the technical proposal of each exemplary embodiment can be combined with each other, however the technical proposal must base on that the ordinary skill in that art can realize the technical proposal, when the combination of the technical proposals occurs contradiction or cannot realize, it should consider that the combination of the technical proposals does not exist, and is not contained in the protection scope required by the present disclosure.

Referring to FIGS. 1-5 and 20, the present disclosure provides a seat support 100a according to a first embodiment.

The seat support 100a includes a support member 1a, a first connecting member 2a and a second connecting member 3a. The support member 1a includes a support portion 11a and an anti-skid portion 12a. The support portion 11a is a sheet, the support portion 11a includes a back side 1101a and a front side 1102a, and the anti-skid portion 12a is arranged on the back side of the support portion 11a. The first connecting member 2a is fixedly connected with a first end (i.e. a front end) of the support portion 11a, and the first connecting member 2a and the first end of the support member 1a enclose a first connecting portion 101a. The second connecting member 3a is fixedly connected with a second end (i.e. a rear end) of the support portion 11a, and the second connecting member 3a and the second end enclose a second connecting portion 34a. In an embodiment, the anti-skid portion 12a is an anti-skid layer arranged on the back side 1102a, and the anti-skid layer 12a is made of an anti-skid material, such as silicone, rubber, nylon, and woven materials with rough surfaces.

The seat support 100a is connected with the seats of a vehicle, such as a car, a bus, a high-speed train, an airplane, and the like. A part of the seat support 100a is arranged on a seat cushion 2011 of the back seat assembly 201 and connected with a backrest 2013 of the back seat, and another part of the seat support 100a is connected with the front seat assembly 202. An area of the seat support 100a between the seat cushion 2011 and the front seat assembly 202 is regarded as a suspension portion 2012. User can sit on the seat cushion 2011 of the back seat assembly 201, and place legs and foot on the suspension portion 2012. In this way, user's legs are supported and the pressures on the legs are relieved. The anti-skid portion 12a on the support member 1a can increase a friction between the support member 1a and the seat cushion 2011. Even if user continuously adjusts his sitting postures, the support member 1a can fit with the seat cushion 2011 orderly. The support portion 11a is a sheet, that is, the support portion 11a is thin, small in size and light in weight, so the seat support 100a can be easily carried when traveling.

Specifically, the first connecting member 2a is fixedly connected with the front seat assembly 202, and the second connecting member 3a is fixedly connected with the back seat assembly 201. In this way, the support member 1a is firmly connected between the back seat assembly 201 and the front seat assembly 202. It should be understood that the first connecting member 2a and the second connecting member 3a are both provided with an adjustment buckle (not labeled), lengths of the first connecting member 2a and the second connecting member 3a can be adjusted to adapt to seats with different sizes, so the support member 1a is firmly connected between the back seat assembly 201 and the front seat assembly 202. Of course, the first connecting member 2a and the second connecting member 3a can further be elastic, and the sizes of the first connecting member 2a and the second connecting member 3a can further be adjusted.

The first connecting member 2a includes a covering portion 211a covering the support portion 11a, and at least a part of the covering portion 211a is not sewn with the support portion 11a, or the covering portion 211a is completely sewn with the support portion 11a; the covering portion 211a passes through the support portion 11a, and the covering portion 211a is a one-piece structure.

The support member 1a is flatly laid between the front seat assembly 202 and back seat assembly 201, and the first connecting member 2a and the second connecting member 3a are used to fix the support member 1a. The first connecting member 2a is fixedly connected with the front seat assembly 202, and the second connecting member 3a is fixedly connected with the back seat assembly 201. In this way, the support member 1a can be stably arranged between the front seat assembly 202 and the back seat assembly 201, and the suspension portion 2012 of the support member 1a can support user's feet and the legs, thereby alleviating the acid swellings and numbness of the feet and the legs. The anti-skid portion 12a can increase the friction between the support portion 11a and the seat cushion 2011, so that the support portion 11a will not move under a movement of user.

Figure 2:
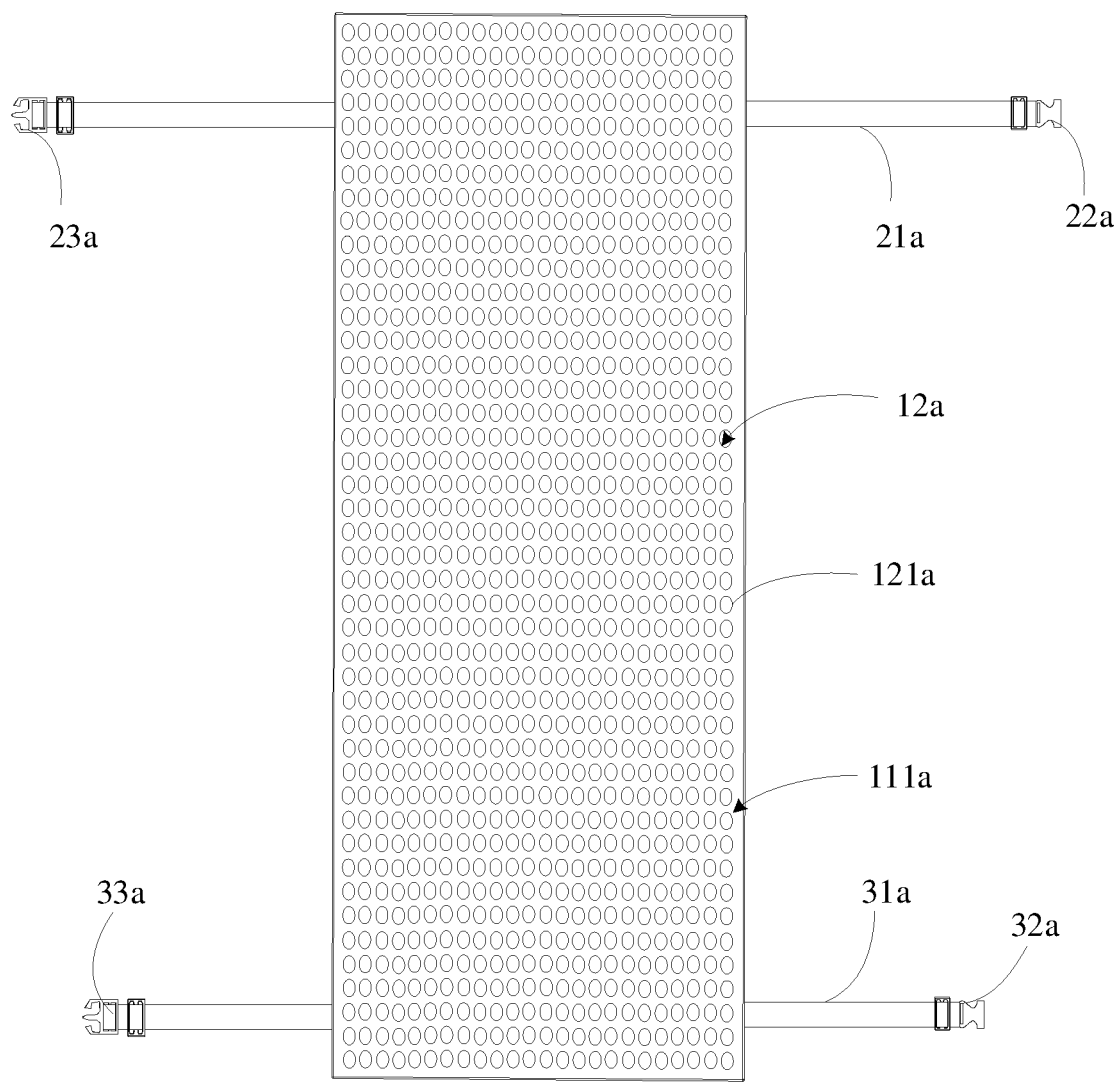
FIG. 2 is another structural diagram of the seat support in FIG. 1.
Figure 3:
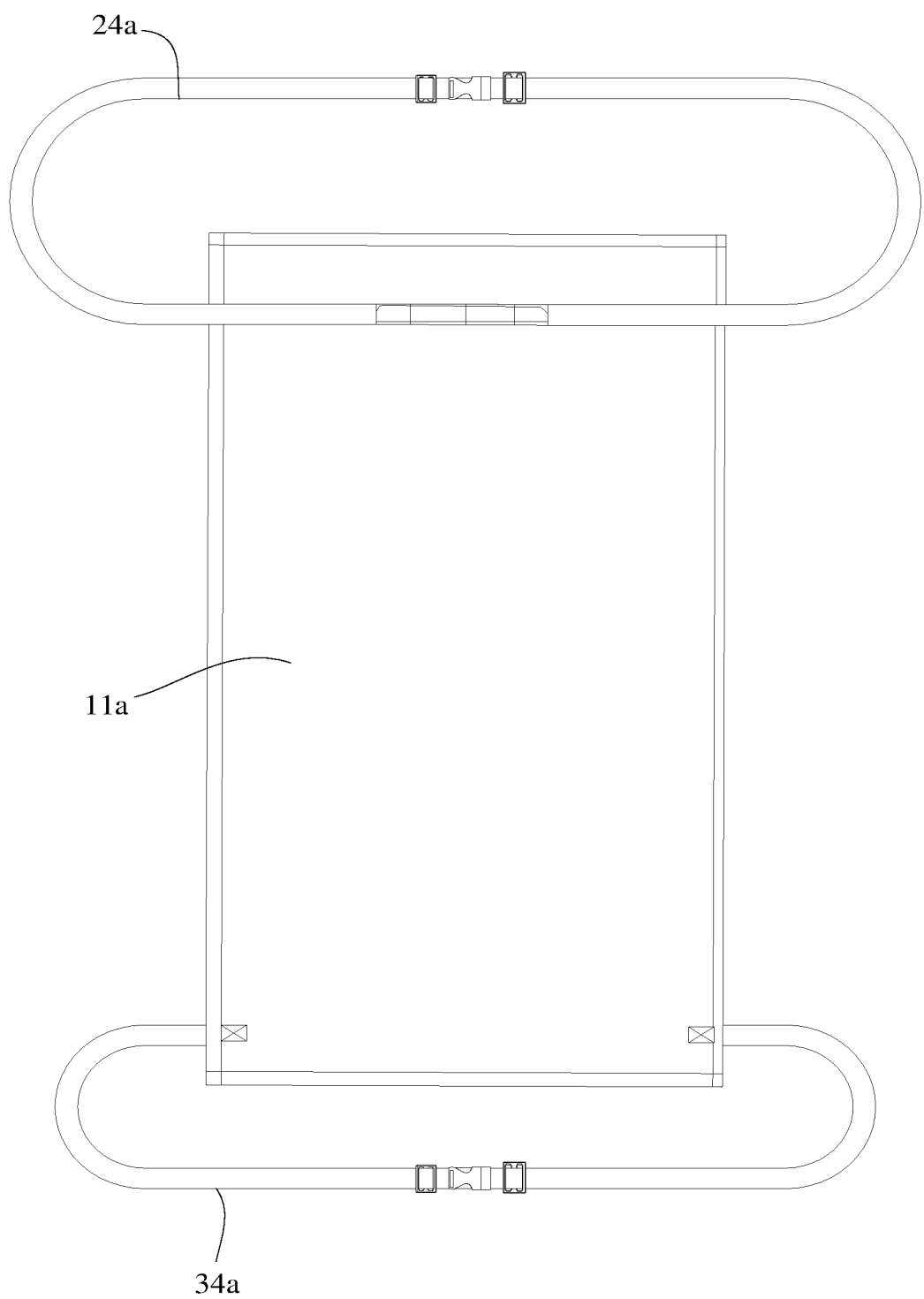
FIG. 3 is a structural diagram of the seat support in FIG. 1, wherein each of the first connecting member and the second connecting member is in a connected state.
Figure 4:
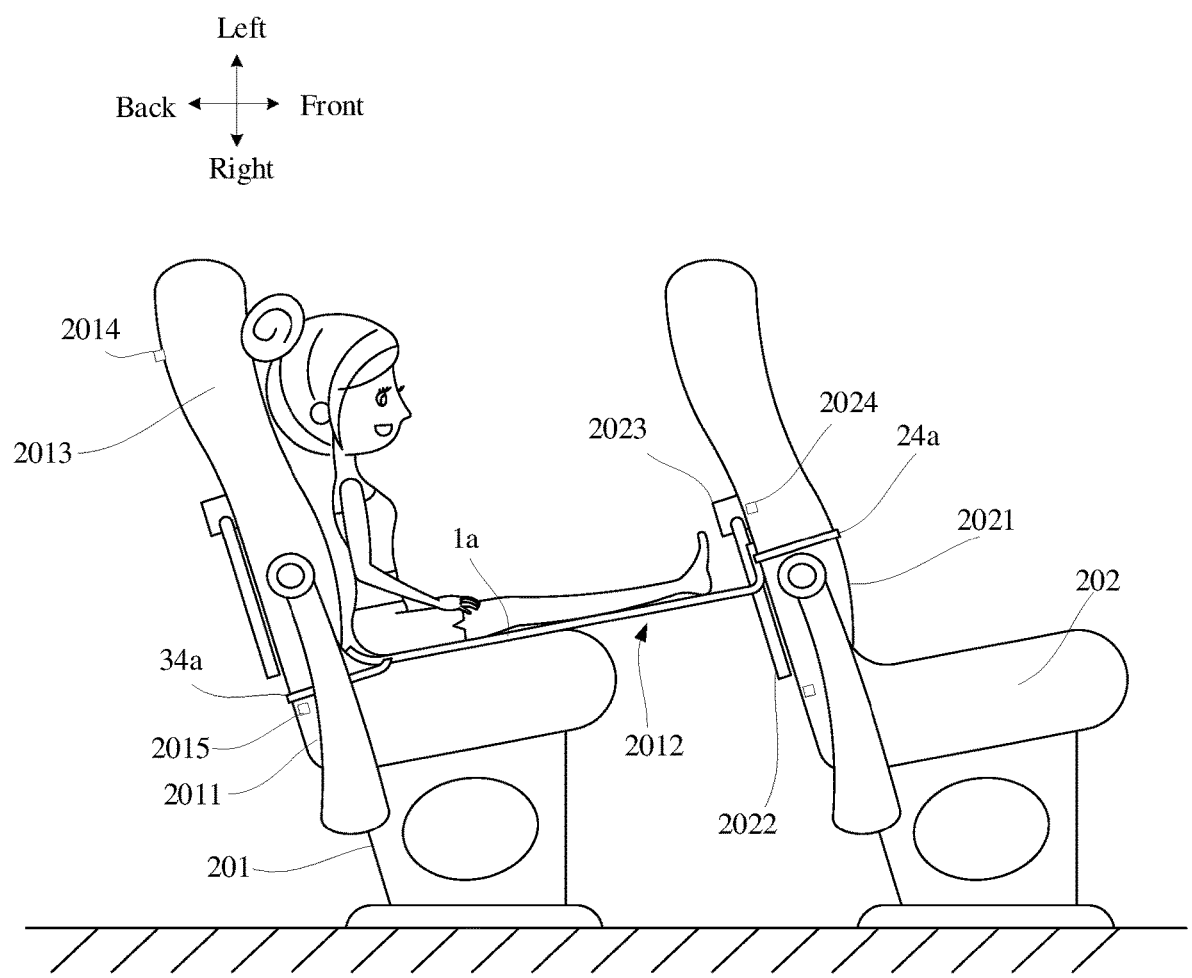
FIG. 4 is a structural diagram of the seat support in FIG. 1, and the seat support is fixed to front and back seats.
Figure 5:
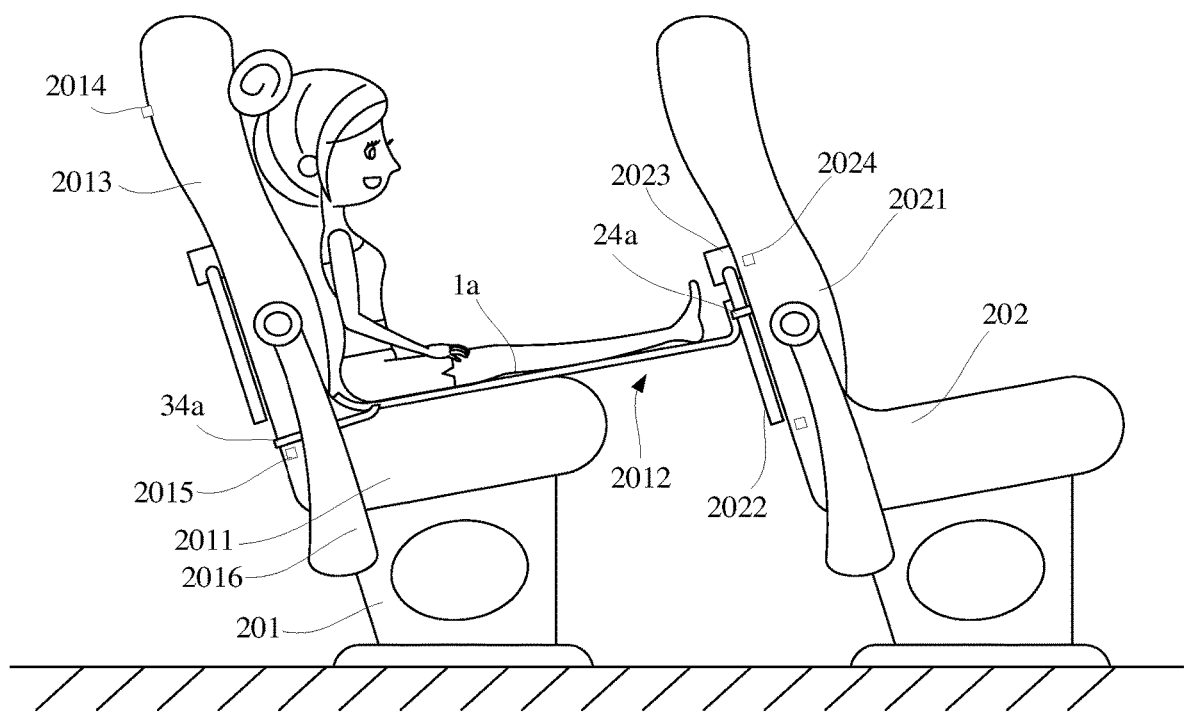
FIG. 5 is another structural diagram of the seat support in FIG. 1, and the seat support is fixed to front and back seats.

Further, referring to FIGS. 1-2, the support portion 11a is made of flexible material. The support portion 11a includes an inner layer 111a and a surface layer 112a fixedly connected with the inner layer 111a. The anti-skid portion 12a is arranged on the inner layer 111a and protruded from an outer surface of the inner layer 111a. Specifically, a periphery of the inner layer 111a is fixedly connected with a periphery of the surface layer 112a. In one embodiment, areas of the inner layer 111a except the periphery are not separated from areas of the surface layer 112a except the periphery, that is, the inner layer 111a is completely fixedly with the surface layer 112a. In another embodiment, at least a portion of areas of the inner layer 111a except the periphery is fixedly connected with an area of the surface layer 112a except the periphery, that is, the inner layer 111a is not completely fixedly with the surface layer 112a.

In order to facilitate the storage and enhance user comfort, the support portion 11a is made of a flexible material. The support portion 11a is preferably made of a breathable flexible material, so it's very breathable for the user's hip and feet. The support portion 11a has a double-layer structure, which is convenient to increase the thickness of the support portion 11a. So that, the user will not feel the presence of the anti-skid portion 12a when sitting on the support portion 11a. Further, it is further conducive to the setting of the anti-skid portion 12a on the thick support portion 11a. When the anti-skid portion 12a is made of plastic materials, the plastic materials are usually injected onto the inner layer 111a, and the inner layer 111a is set thinner, which can facilitate the attachment of plastic materials. It should be understood that in order to further increase the comfort of the support portion 11a, sponge or cotton can be filled between the inner layer 111a and the surface layer 112a.

Further, please referring to FIG. 2, the inner layer 111a is made of flexible material, such as cloth, fiber, paper cloth, polyurethane, PVC (Polyvinyl Chloride) flocking, etc. The periphery of the inner layer 111a is fixedly connected with the periphery of the surface layer 112a. The anti-skid portion 12a is arranged on the outer surface of the inner layer 111a. The inner layer 111a is also fixedly connected to a middle portion of the surface layer 112a.

The anti-skid portion 12a includes a plurality of anti-skid bumps 121a, which are arranged on the outer surface of the inner layer 111a. The anti-skid bump 121a is made of plastic, silicone, or rubber. The anti-skid bumps 121a are uniformly arranged on the back side; or the anti-skid bumps 121a are randomly arranged on the back side. The anti-skid bump 121a has a diameter of about 0-200 mm, for example, the anti-skid bump 121a has a diameter of 0.1 mm, 1 mm, 2 mm, 3 mm, 4 mm, 5 mm, 10 mm, 50 mm, 100 mm, 150 mm, or 200 mm. The anti-skid bump 121a has a height of about 0-20 mm, for example, the anti-skid bump 121a has a height of 0.1 mm, 0.2 mm, 0.5 mm, 1 mm, 1.5 mm, 2 mm, 5 mm, 10 mm, 15 mm, or 20 mm A space between two adjacent anti-skid bumps 121a is about 0-200 mm, for example, the space between two adjacent anti-skid bumps 121a is 0.1 mm, 1 mm, 2 mm, 3 mm, 4 mm, 5 mm, 10 mm, 50 mm, 100 mm, 150 mm, or 200 mm. The anti-skid bumps 121a are arranged in a plurality of bump groups, diameters of bumps in each bump groups gradually decrease or increase in a direction from the back seat assembly 201 to the front seat assembly 202, or heights of bumps in each bump groups gradually decrease or increase in a direction from the back seat assembly 201 to the front seat assembly 202.

The cloth material has a good air permeability, and the anti-skid portion 12a can be quickly bonded with the inner layer 111a during injection molding. In order to ensure that the anti-skid portion 12a will not affect the comfort of the seat support 100a, the anti-skid portion 12a is set as a plurality of anti-skid bumps 121a, so that user can hardly feel the presences of the anti-skid bumps 121a even when he is sitting on the support portion 11a.

Further, a thickness of the surface layer 112a is greater than that of the inner layer 111a. The thinner inner layer 111a can facilitate a rapid prototyping of anti-skid bumps 121a, and the thicker surface layer 112a can reduce the presences of anti-skid bumps 121a.

Further, the inner layer 111a and the surface layer 112a are made of flexible material, such as cloth, fiber, paper cloth, polyurethane, PVC (Polyvinyl Chloride) flocking, etc., and the periphery of the inner layer 111a is sewn and fixedly connected with the periphery of the surface layer 112a. The cloth has a good air permeability. Both the surface layer 112a and the inner layer 111a are made of cloth, so the surface layer 112a and the inner layer 111a can be easily stored, carried and cleaned.

Further, both the first connecting member 2a and the second connecting member 3a are fixedly connected with the outer surface of the surface layer 112a of the support portion 11a, to prevent the first connecting member 2a and the second connecting member 2a from affecting the arrangement of the anti-skid portion 12a. In another embodiment, the first connecting member 2a or the second connecting member 3a can also be arranged on an inner surface of the surface layer 112a or an inner surface of the inner layer 111a. In a further embodiment, the first connecting member 2a or the second connecting member 3a can also be arranged on an outer surface of the inner layer 111a.

Further, referring to FIGS. 1 and 2, the first connecting member 2a includes a connecting belt 21a (which can be a long mesh belt), a connecting part 22a (which can be a clamping seat), and a connecting part 23a (which can be a clamping head). A middle section of the connecting belt 21a is fixedly connected with the support portion 11a, and both ends of the connecting belt 21a extend outside the support portion 11a. One end of the connecting belt 21a is connected with the connecting part 22a, the other end is connected with the connecting part 23a. When the connecting part 22a is detachably connected with the connecting part 23a, the connecting belt 21a, the connecting part 22a, the connecting part 23a, the support portion 11a enclose the connecting portion 24a. The connecting belt 21a may be connected with the inner layer 111a or the surface layer 112a or connected between the inner layer 111a and the surface layer 112a.

The second connecting member 3a includes two connecting belts 31a (which can be medium length mesh belt), a connecting part 32a (which can be a clamping seat) and a connecting part 33a (which can be a clamping head). One end of the connecting belt 31a is fixedly connected with a corner at the first end of the support portion 11a, and the other end extends out of the support portion 11a. One of the two connecting belts 31a is fixedly connected with the connecting part 32a, the other one is fixedly connected with the connecting part 33a. When the connecting part 32a is clamped with the connecting part 33a, the two connecting belts 31a, the connecting part 32a, the connecting part 33a and the support portion 11a enclose the second connecting portion 34a.

The connecting part 22a is clamped with the connecting part 23a to form a ring shaped connecting portion 24a. The ring shaped connecting portion 24a sleeves on the backrest 2021 of the front seat assembly 202 (see FIG. 4), or sleeves on a table 2022 arranged on the front seat assembly 202 (see FIG. 5), or sleeves on a connecting element 2023 which is configured to connect the table 2022 with the backrest 2021. In addition, both ends of the connecting belt 21a can pass the backrest 2021 of the front seat assembly 202 from both sides, and then the connecting part 22a is clamped in the connecting part 23a, so that the seat support 100a can be connected with the front seat assembly 202 rapidly. The two second connecting belts 31a may be asymmetrically connected with the support portion 11a, so that seat support 100a has a high the fault tolerance. The second connecting belts 31a form an annular second connecting portion 34a by connecting the connecting part 32a with the connecting part 33a. The second connecting portion 34a can sleeve on the back seat assembly 201, to connect the seat support 100a with the back seat assembly 201. The second connecting portion may be installed in the same way as the first connecting portion, so it will not be described here.

It should be understood that the connecting belt 21a and the connecting belt 31a are fixedly connected with the support portion 11a by sewing. In this way, the connecting belt 21a and the connecting belt 31a are relatively stably connected with the support portion 11a. It should be understood that the connecting part 22a is adapted to the connecting part 23a, and can be connected and matched with each other. This connection mode is simple and reliable, and is convenient for users to operate.

Figure 6:
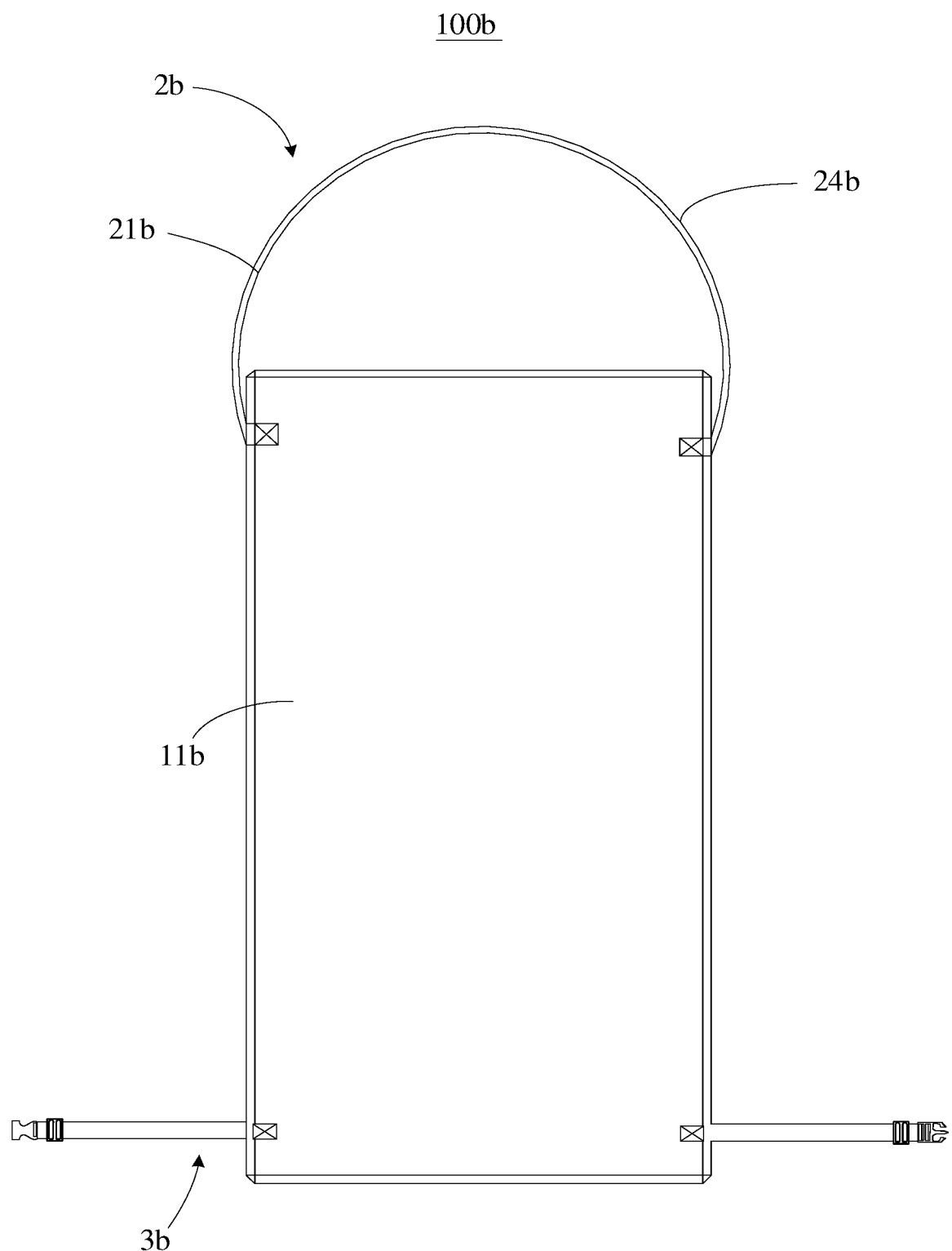
FIG. 6 is a structural diagram of a seat support according to a second embodiment of the present disclosure.

Referring to FIG. 6, the present disclosure provides a seat support 100b according to a second embodiment. The seat support 100b is similar to the seat support 100a in structure, and the differences between the two at least include: the first connecting member 2b is an elastic belt 21b, two ends of the elastic belt 21b are fixedly connected with two corners of the first end of the support portion 11a, and the elastic belt 21b and the support portion 11a enclose the connecting portion 24b.

User can adjust the length of the elastic belt 21b more quickly than the adjusting buckle. The two ends of the elastic belt 21b are fixedly connected with the support portion 11b to forms the annular connecting portion 24b which can sleeve on the front seat assembly 202.

The second connecting member 3b is similar with the second connecting member 3a in structure.

Figure 7:
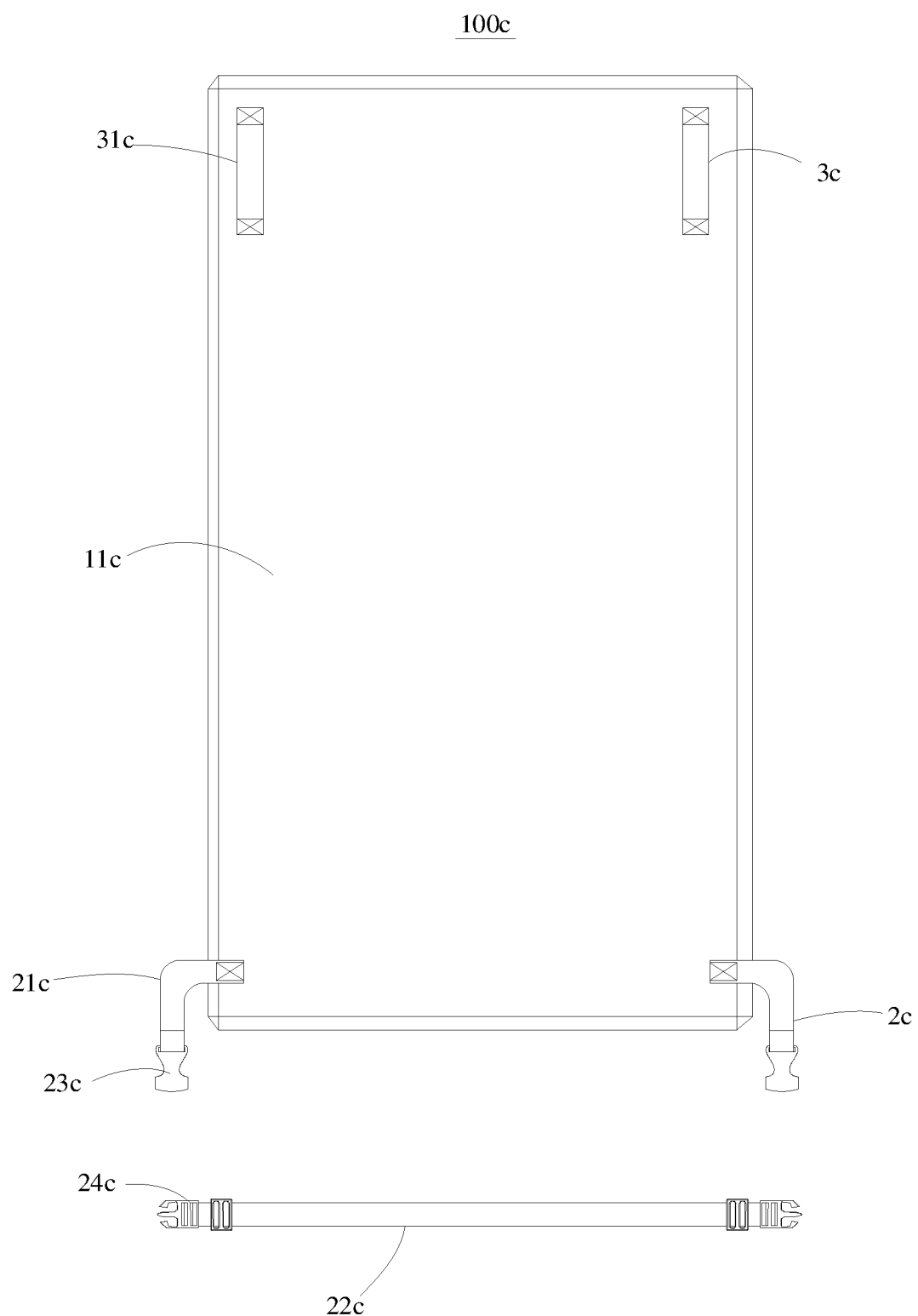
FIG. 7 is a structural diagram of a seat support according to a third embodiment of the present disclosure.
Figure 8:
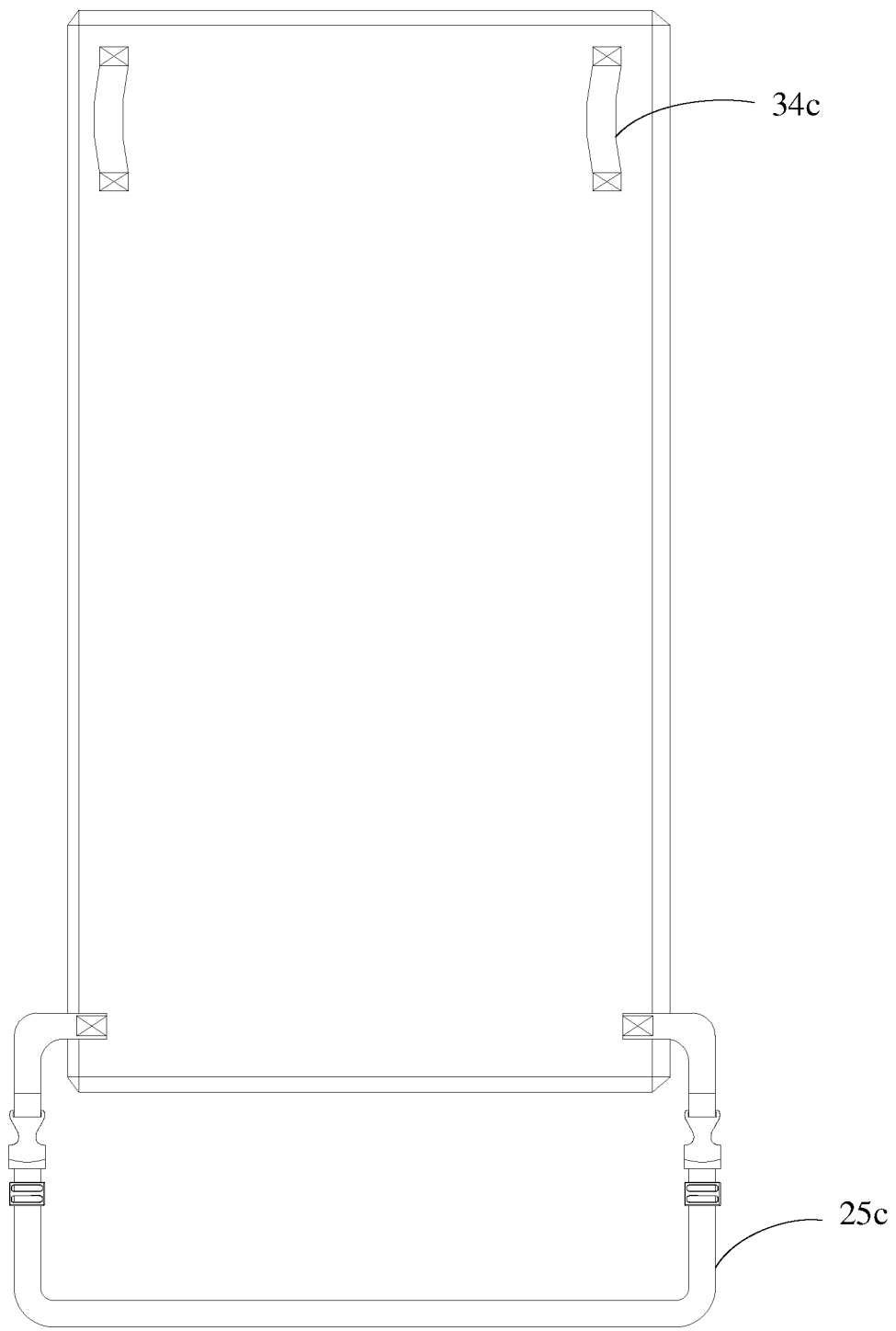
FIG. 8 is a structural diagram of the seat support in FIG. 7, wherein the first connecting member is in a connected state.

Referring to FIGS. 7-8, the present disclosure provides a seat support 100c according to a third embodiment. The seat support 100c is similar to the seat support 100a in structure, and the differences between the two at least include: the second connecting member 3c includes two connecting belts 31c (which can be short mesh belts), both ends of each connecting belt 31c are fixedly connected with the support portion 11c, and a middle portion of each connecting belt 31c is separated from the support portion 11c to form a connecting portion 34c for the safety belt to pass through; the first connecting member 2c includes two connecting belts 21c (which can be short mesh belts), a connecting belt 22c (which can be a mesh belt with a medium length), two connecting parts 23c (which can be clamping seats), and two connecting parts 24c (which can be clamping heads); ends of the two connecting belts 21c are fixedly connected with two corners of the second end of the support portion 11c, other ends of the two connecting belts 21c bently extend out of the support portion 11c and connect with the two connecting parts 23c respectively; both ends of the connecting belt 22c are respectively connected with two connecting parts 24c; the connecting parts 23c are clamped with the connecting parts 24c; two connecting belts 21c, the connecting belt 22c, the connecting parts 23c, the connecting parts 24c, and the support portion 11c form the connecting portion 25c which can sleeve on the backrest 2021 of the front seat assembly 202 or connected with the table 2022 of front seat assembly 202; ends of the two connecting belts 31c are fixed on the support portion 11c, and the two connecting belts 31c and the support portion 11c cooperatively form the connecting portions 34c; the safety belts of the back seat assembly 201 can pass through the two connecting portions 34c respectively, and then user fixes the safety belts, so that the second connecting member 3c can further be fixed.

In another embodiment, the second connecting member 3c is the same as the second connecting member 3e, the first connecting member 2a, or the second connecting member 3b.

Figure 9:
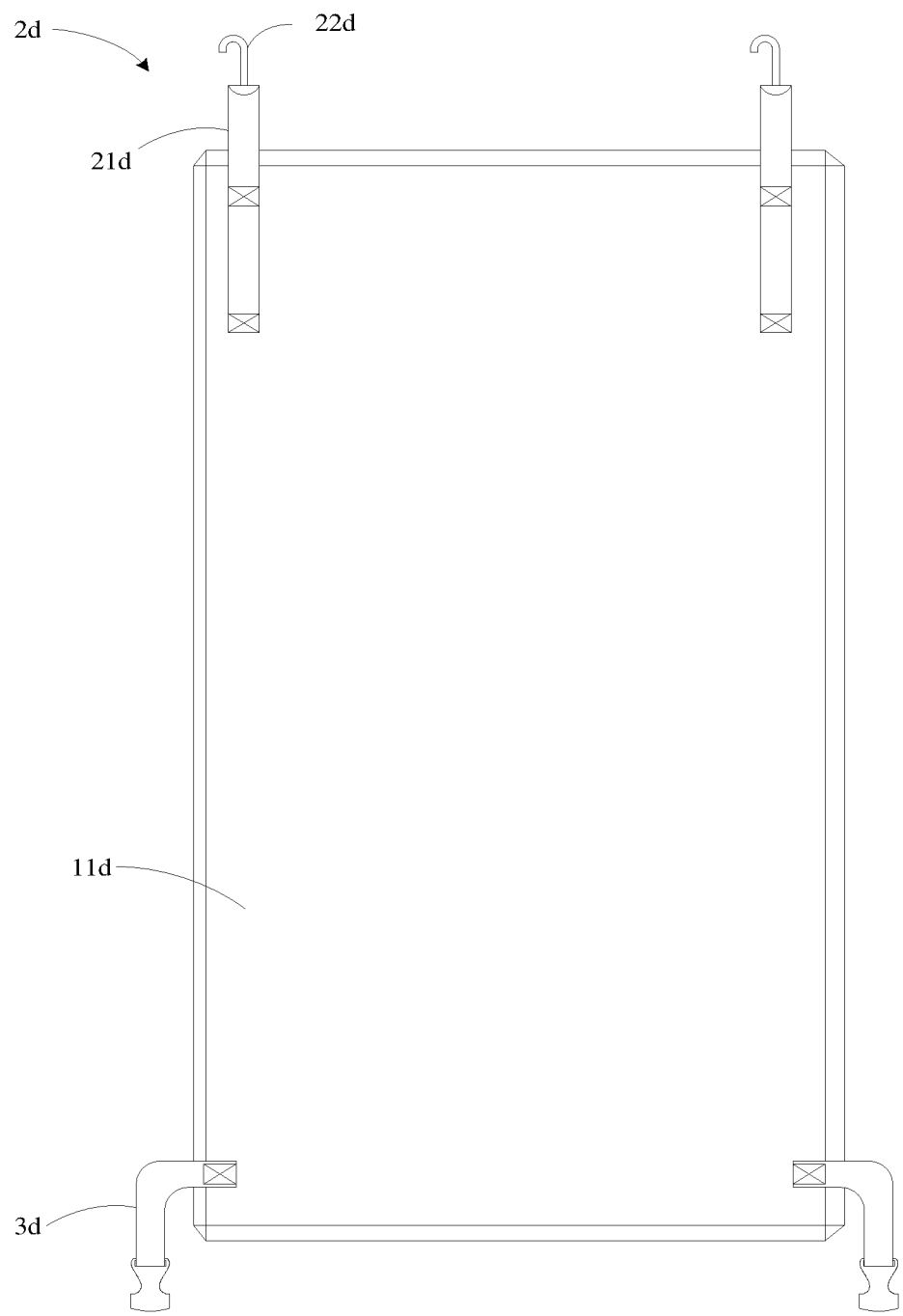
FIG. 9 is a structural diagram of a seat support according to a fourth embodiment of the present disclosure.
Figure 9:
Figure 10:
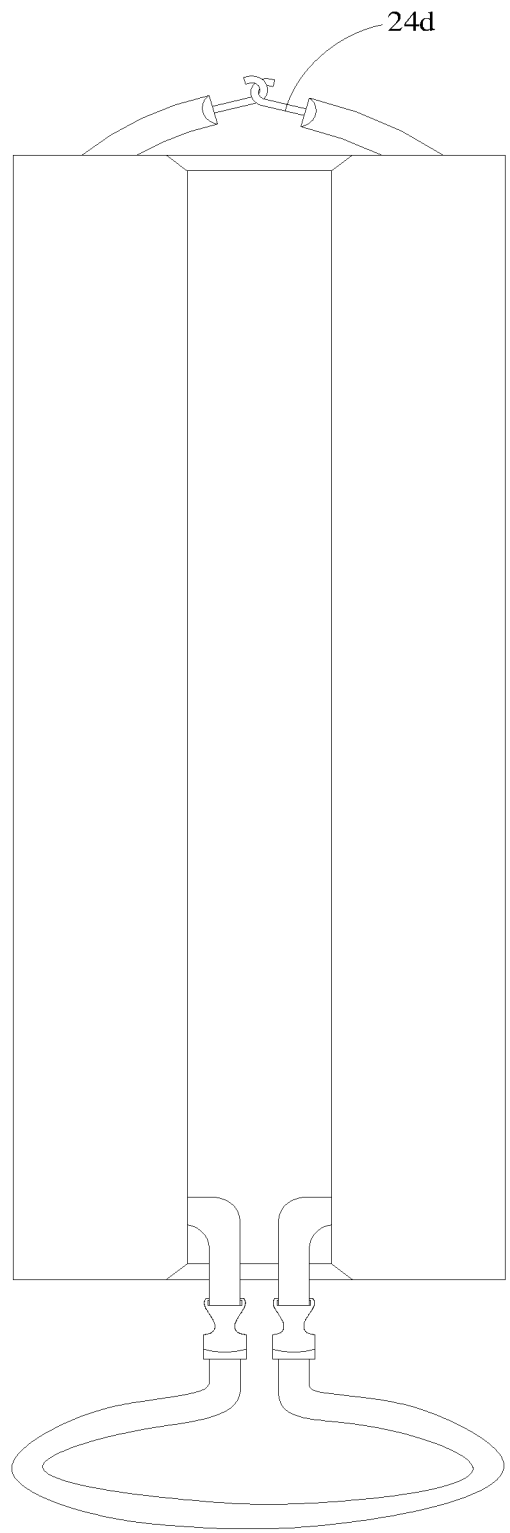
FIG. 10 is a structural diagram of the seat support in FIG. 9, wherein the first connecting member and the second connecting member are in a connected state.
Figure 11:
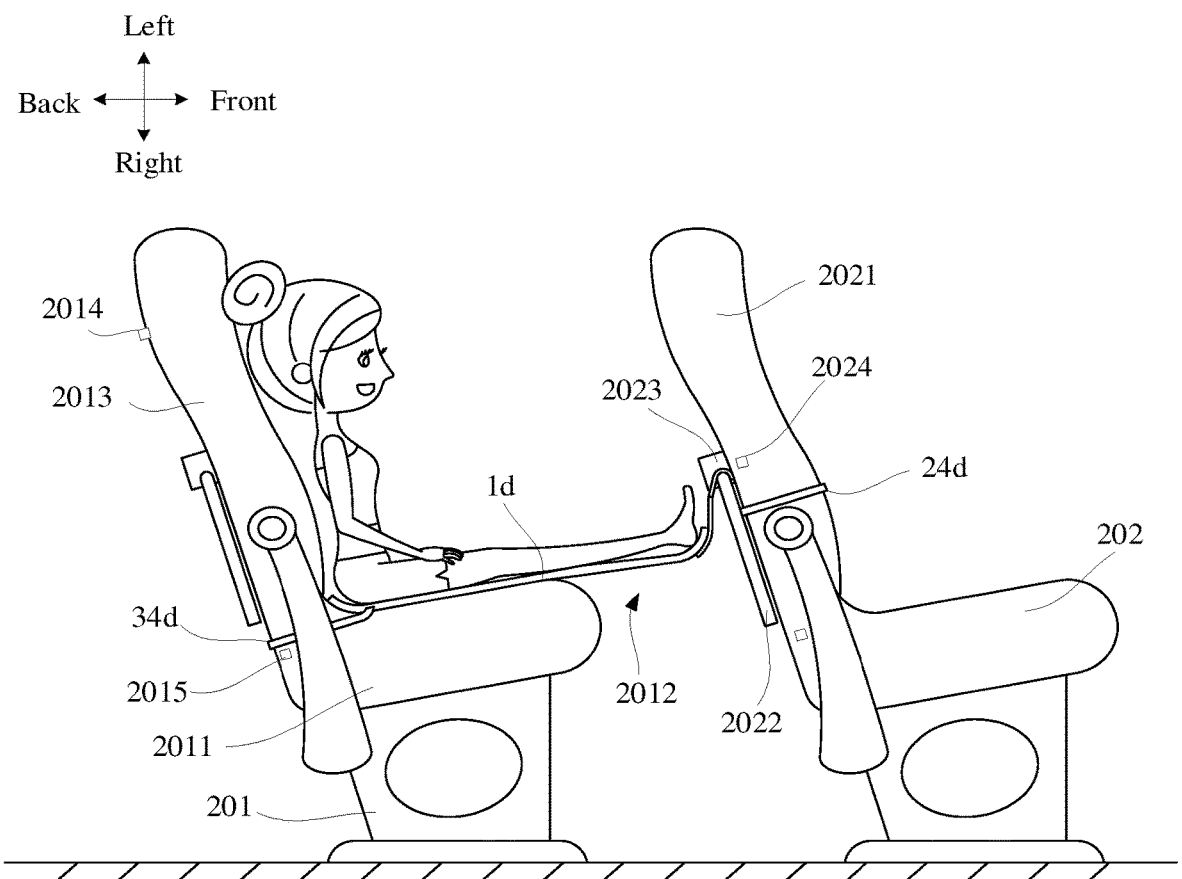
FIG. 11 is a structural diagram of the seat support in FIG. 9, and the seat support is fixed to front and back seats.

Referring to FIGS. 9-11, the present disclosure provides a seat support 100d according to a fourth embodiment. The seat support 100d is similar to the seat support 100c in structure, and the differences between the two at least include: the first connecting member 2d includes two connecting belts 21d (which can be short mesh belts) and two connecting parts 22d (which can be locking hooks, hangers, etc.); end of the two connecting belt 21d are fixed at two corners of the first end of the support portion 11d, the other ends of the two connecting belts 21d are respectively fixedly connected with the connecting parts 22d.

The connecting parts 22d can be connected with the connecting element 2023 arranged on the backrest 2021 of the front seat assembly 202 or connected with buckles 2024 of the front seat assembly 202 arranged on the backrest 2021, the buckles 2024 of the front seat assembly 202 are used for hanging luggage, so that the first end of the seat support 100d can be fixed on the front seat assembly 202. It should be understood that the two connecting parts 22d may also be connected to each other to form a connecting portion 24d which is configured to connect with the table 2022 of the front seat assembly 202.

In an embodiment, the connecting parts 22d can be connected with the buckles 2015 arranged on two sides of the backrest 2013, to connect the seat support 100d with the back seat assembly 201. In another embodiment, the connecting parts 22d are fixed in the gap between the backrest 2013 and the seat cushion 2011, to connect the seat support 100d with the back seat assembly 201.

The second connecting member 3d is similar as the second connecting member 3c in structure.

Figure 12:
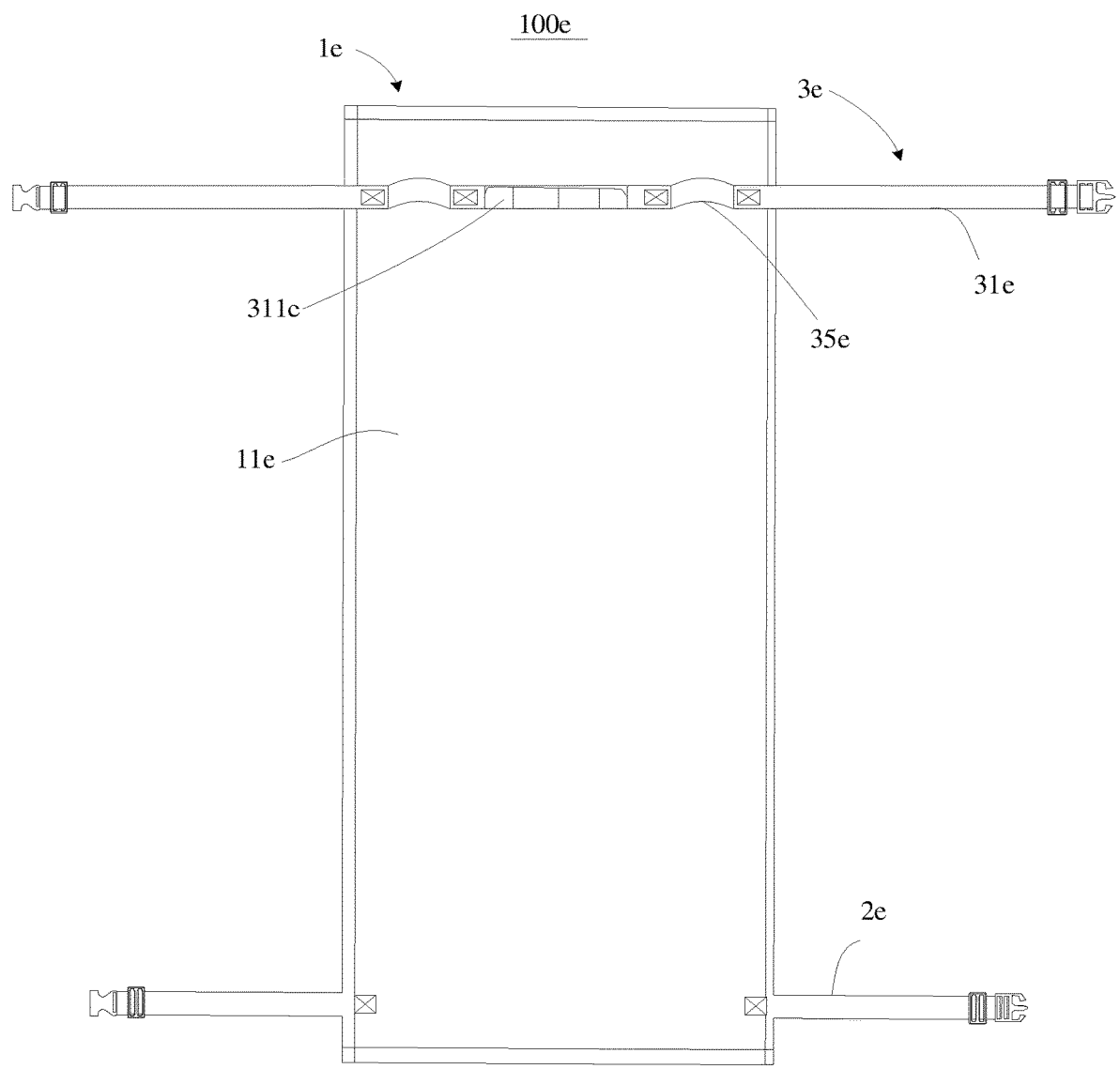
FIG. 12 is a structural diagram of a seat support according to a fifth embodiment of the present disclosure.

Referring to FIG. 12, the present disclosure provides a seat support 100e according to a fifth embodiment. The seat support 100e is similar to the seat support 100a in structure, and the differences between the two at least include: the connecting belt 31e of the second connecting member 3e includes a covering portion 311e covering the support portion 11e, and at least a part of the covering portion 311e is not sewn with the support portion 11e to form the connecting portion 35e; the covering portion 311e pass through the support portion 11e along a radial direction of the support portion 11e. The covering portion 311e is a one-piece structure.

In an embodiment, two portions of the covering portion 311e are not sewn with the support portion 11e to form two connection portions 35e spaced at intervals.

The safety belts 2016 of the back seat assembly 201 can pass through the two connecting portions 35e respectively, and then user fixes the safety belts 2016. In this way, the two connecting members 3e can further be fixed.

The connecting member 2e is similar with the connecting member 3a in structure.

Figure 13:
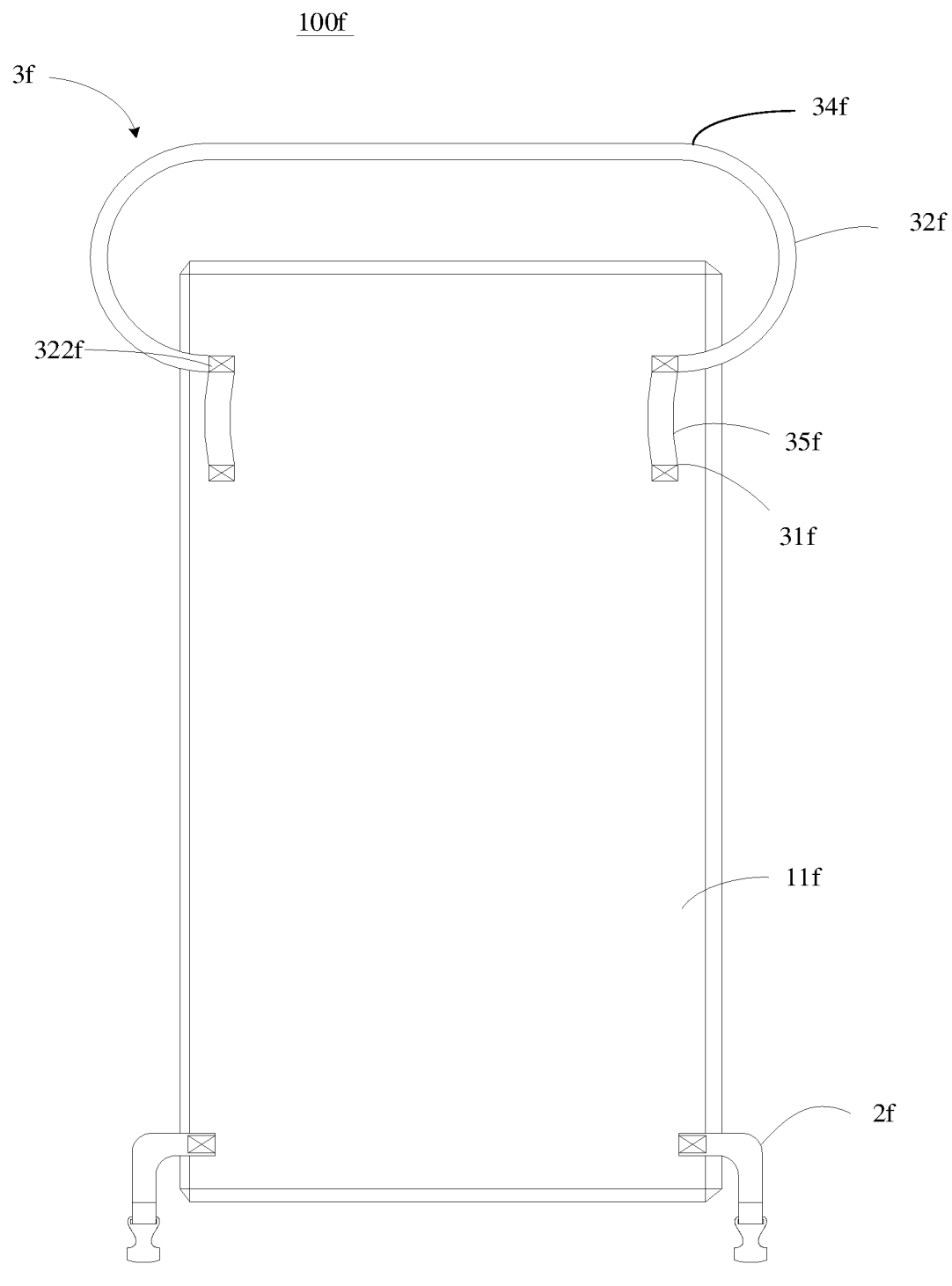
FIG. 13 is a structural diagram of a seat support according to a sixth embodiment of the present disclosure.

Referring to FIG. 13, the present disclosure provides a seat support 100f according to a sixth embodiment. The seat support 100f is similar to the seat support 100c in structure, and the differences between the two at least include: the second connecting member 3f includes two connecting belts 31f and an elastic belt 32f, and both ends of the elastic belt 32f are respectively connected with both ends of the support portion 11f to form the connecting portion 34f which can sleeve on the backrest 2013; both ends of the connecting belt 31f are connected with the support portion 11f to form the connecting portion 35f for the safety belt to pass through.

The suturing portion of the elastic belt 32f and the support portion 11f at least partially coincides with the suturing portion of the connecting belt 31f and the support portion 11f.

The connecting member 2f is similar with the connecting member 3d in structure.

Figure 14:
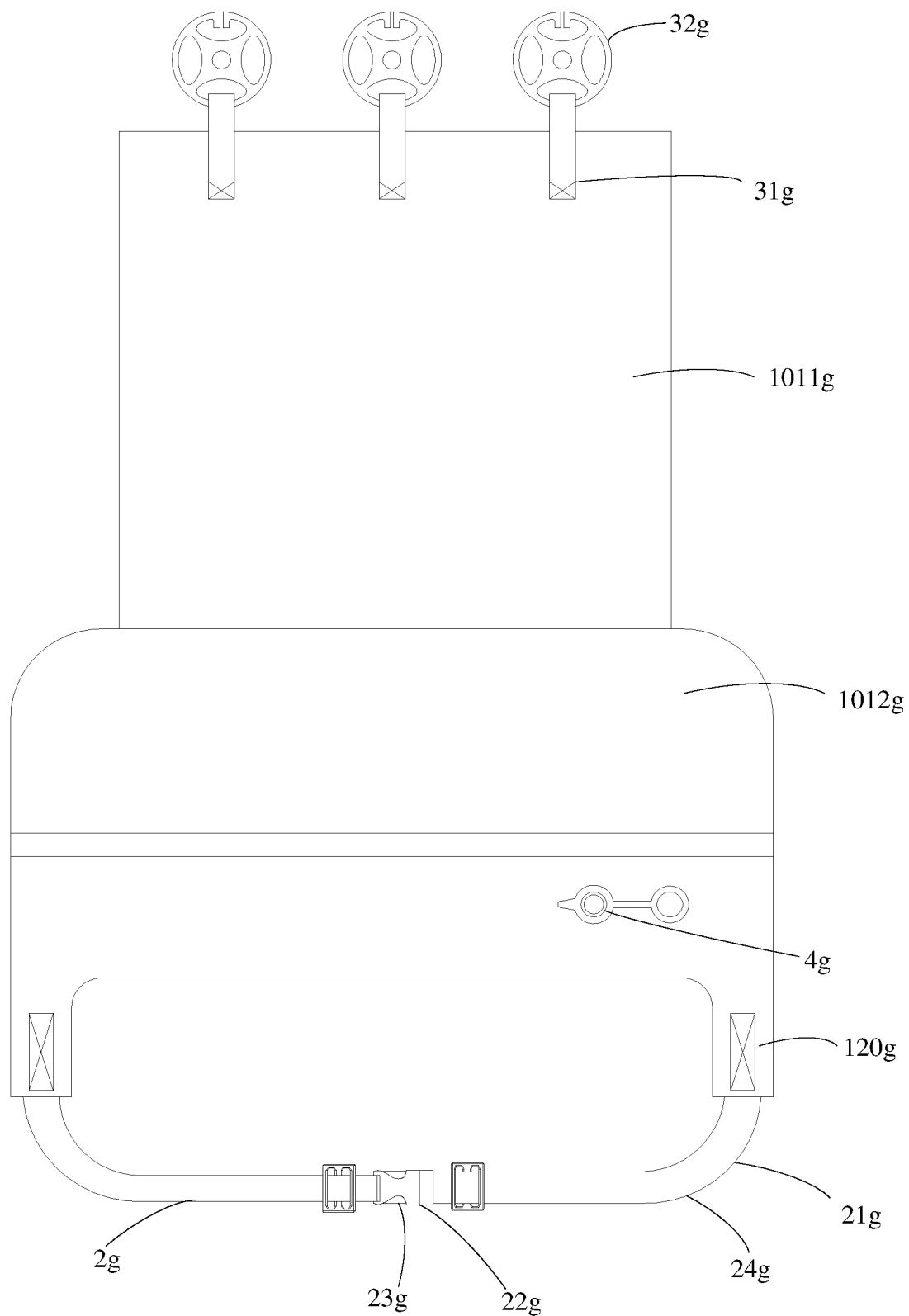
FIG. 14 is a structural diagram of a seat support according to a seventh embodiment of the present disclosure.

Please referring to FIG. 14, the present disclosure provides a seat support 100g according to a seventh embodiment. The seat support 100g is similar to the seat support 100b in structure, and the differences between the two at least include: the seat support 100g further includes a first sub support 1011g and a second sub support 1012g connected with the first sub support 1011g; the first sub support 1011g is arranged on the seat cushion 2011 of the back seat assembly 201, the second sub support 1012g is connected with the front seat assembly 202 and the first sub support 1011g to form the suspension portion 2012 for supporting the legs and feet; the second connecting member 3g includes at least one connecting belt 31g and at least one clamping part 32g; the connecting belt 31g is connected with the first sub support 1011g and extends out of the first sub support 1011g; the clamping part 32g is connected with the portion of the connecting belt 31g and extended out of the first sub support 1011g, the clamping part 32g may be round in shape or have other suitable shape; the clamping part 32g can be clamped in a gap between the seat cushion 2011 of the back seat assembly 201 and the backrest 2013 of the back seat assembly 201 to fix the first sub support 1011g; the seat support 100g further includes two opposite connecting belts 21g, a connecting part 22g (which may be a clamping seat) and a connecting part 23g (which may be a clamping head), the connecting part 22g and the connecting part 23g are respectively connected with the free ends of the two connecting belts 21g, the connecting belts 21g, the connecting part 22g, the connecting part 23g and the second sub support 1012g cooperatively form the connecting portion 24g, the connecting portion 24g sleeves on the front seat assembly 202; the second sub support 1012g is further provided with a gas charging and discharging member 4g to charge and discharge the second sub support 1012g.

The first sub support 1011g and the second sub support 1012g may be made of different or same materials. A width of the second sub support 1012g can be greater than that of the first sub support 1011g to support the user's legs well.

The second sub support 1012g is protruded with two connecting protrusions 120g, and two connection belts 21g are respectively connected with two connecting protrusions 120g.

Figure 15:
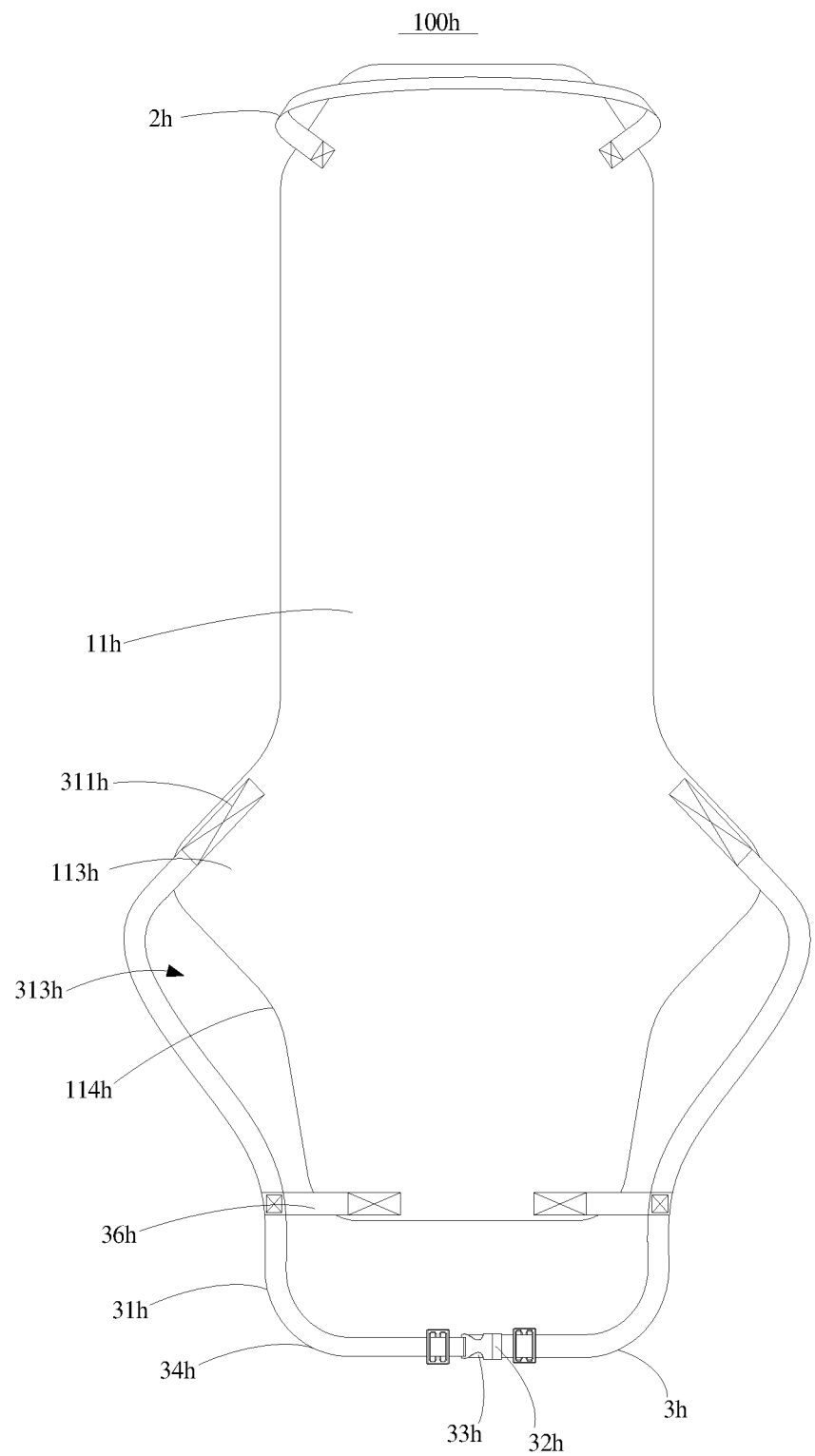
FIG. 15 is a structural diagram of a seat support according to an eight embodiment of the present disclosure.

Referring to FIG. 15, the present disclosure provides a seat support 100h according to an eighth embodiment. The seat support 100h is similar to the seat support 100b in structure, and the differences between the two at least include: the support portion 11h includes two convex portions 113h and two recessed portions 114h, the second connecting member 3h includes two connecting belts 31h, a connecting part 32h and a connecting part 33h, and the two connecting belts 31h are connected by the connecting part 32h and the connecting part 33h; one end of the connecting belt 31h is connected with the convex portion 113h, the connecting belt 31h and the recessed portion 114 cooperatively form a connecting portion 313h to connect with the safe belt, in detail, the safety belt can pass through the connecting portion 313h; the second connecting member 3h further includes two connecting belts 36h for connecting the connecting belt 31h with the support portion 11h; the connecting belt 31h, the connecting belt 36h, the connecting part 32h, the connecting part 33h, and the support portion 11h form the connecting portion 34h.

The first connecting member 2h is similar with the first connecting member 2b in structure.

Figure 16:
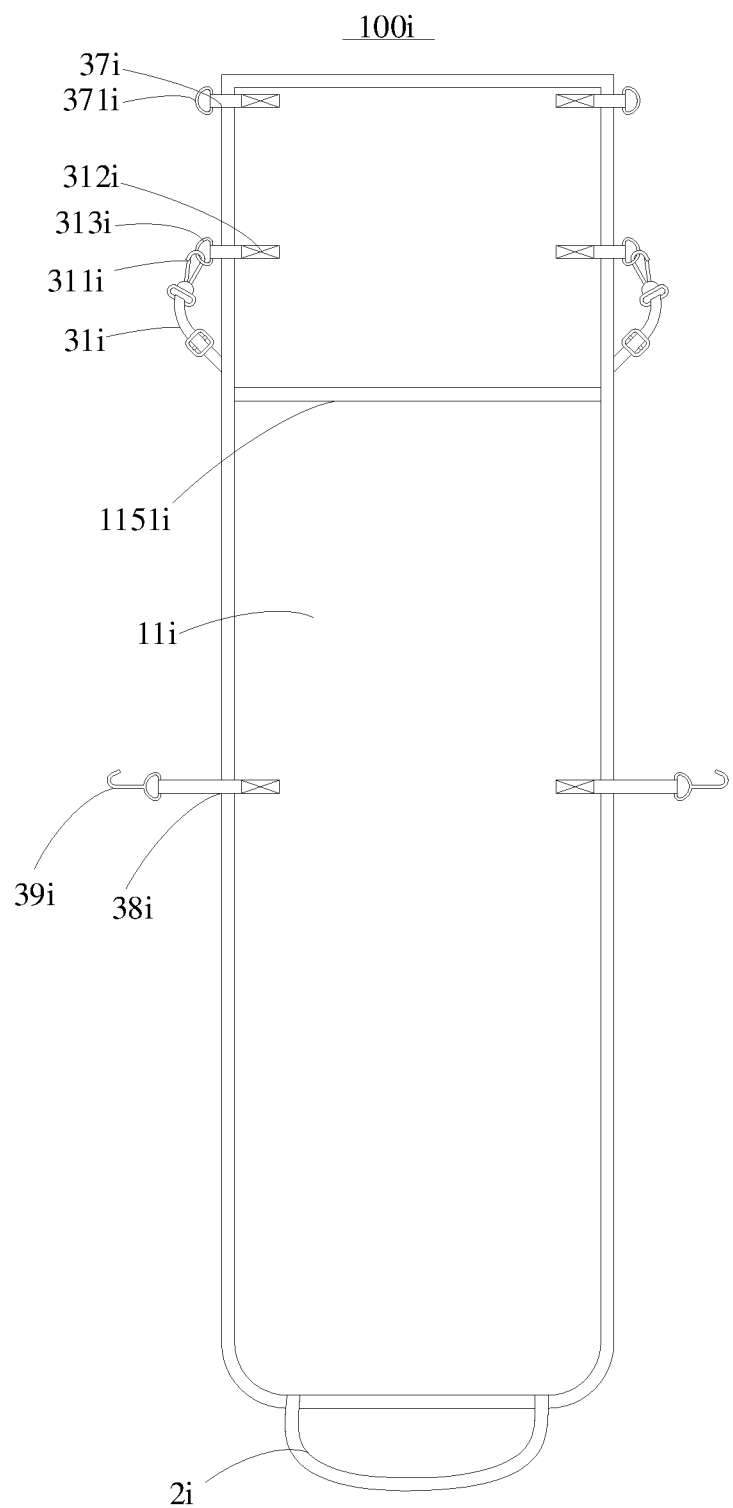
FIG. 16 is a structural diagram of a seat support according to a ninth embodiment of the present disclosure.

Please referring to FIG. 16. the present disclosure provides a seat support 100i according to a ninth embodiment. The seat support 100i is similar to the seat support 100b in structure, and the differences between the two at least include: the support portion 11i includes a sleeving portion 115i configured to sleeve on the backrest 2013 of the back seat assembly 201; the second connecting member 3i further includes two connecting belts 37i protruded from both ends of the support portion 11i respectively, a free end of the connecting belt 37i is provided with a connecting ring 371i configured to connect with a hook 2014 arranged on the back seat assembly 201; the connecting belt 31i is positioned between the connecting belt 37i and an opening of the sleeving portion 115i; the connecting belt 31i is provided with a clamping ring 311i, and the clamping ring 311i is detachably clamped with a connecting ring 312i connected with the connecting belt 313i, the connecting belt 313i is arranged between the connecting belt 37i and the connecting belt 31i; the second connecting member 3i further includes two connecting belts 38i and two connecting parts 39i, each connecting part 39i is connected with one connecting belt 38i, and the connecting part 39i can be clamp with the safety belt of the vehicle.

It should be understood that, the first connecting member 2i sleeves on the back seat assembly 201, the connecting parts 39i are connected with the safety belts 2016 or buckles 2015 on the backrest 2013, the connecting belts 31i are connected with the front seat assembly 202, the sleeving portion 115i may be used as a pocket. The first connecting member 2i can sleeve the back seat assembly 201.

The first connecting member 2i is similar with the first connecting member 2b in structure.

Figure 17:
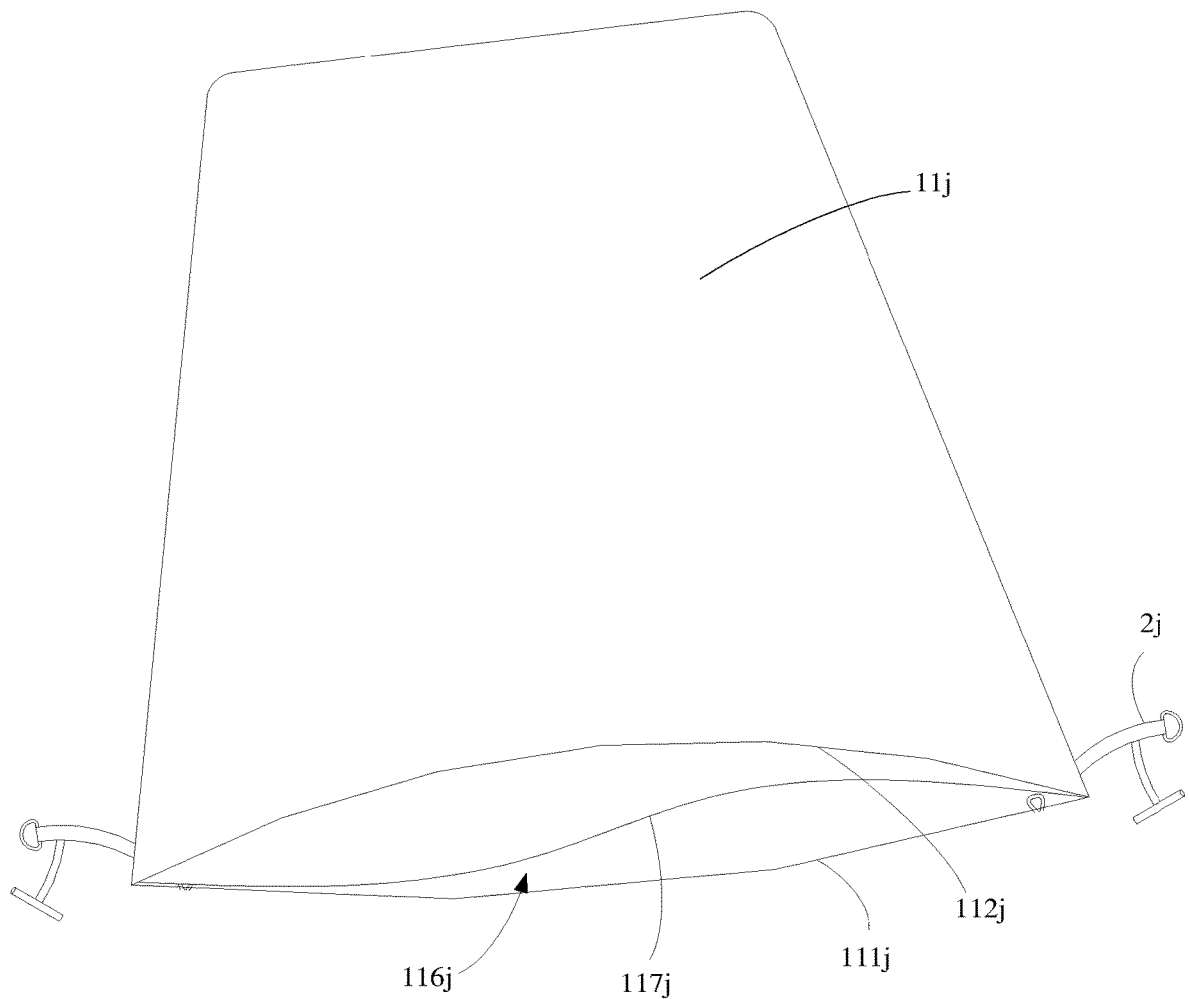
FIG. 17 is a structural diagram of a seat support according to a tenth embodiment of the present disclosure.
Figure 18:
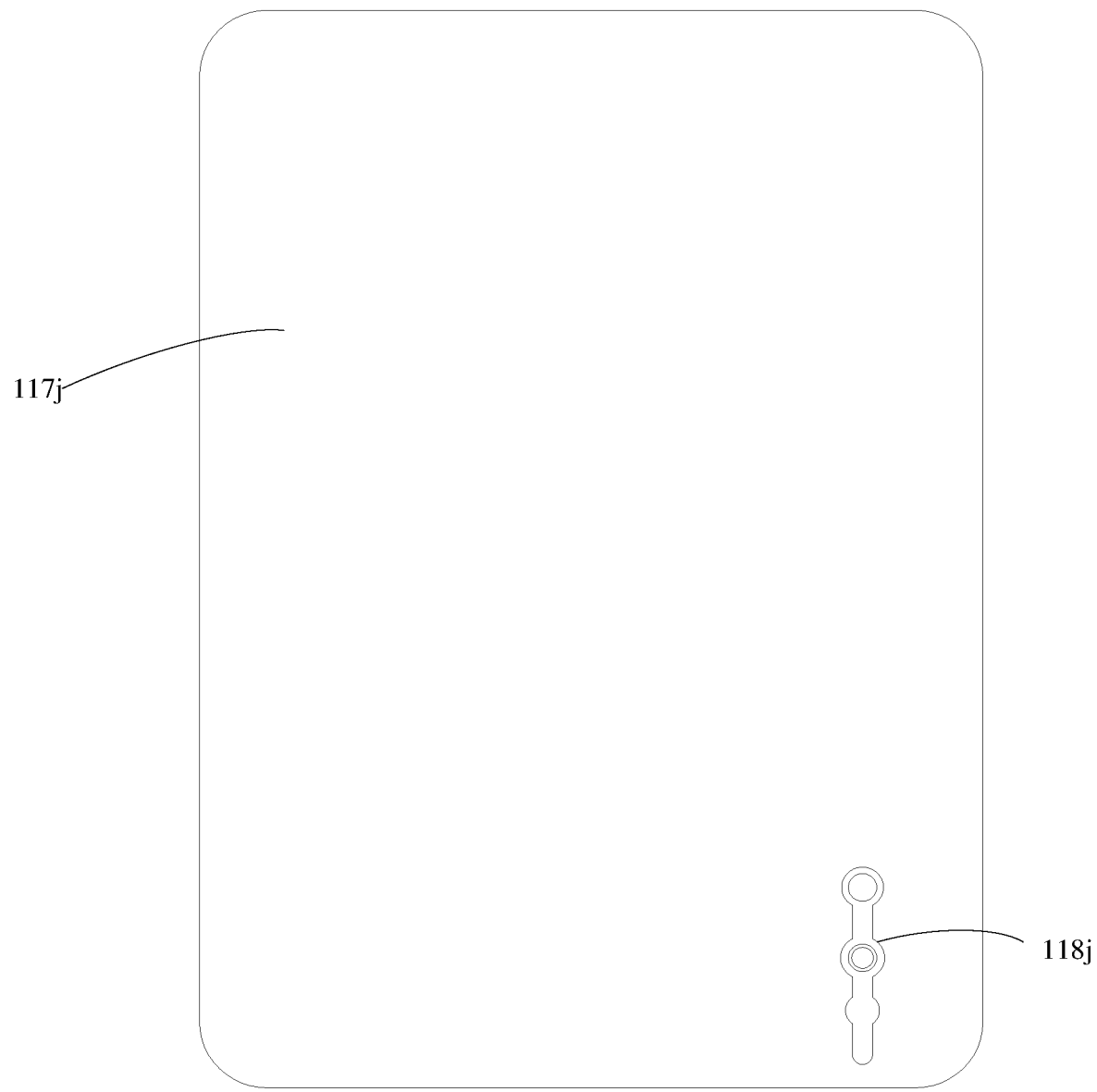
FIG. 18 is a structural diagram of an airbag of the seat support in FIG. 17.

Referring to FIGS. 17-18, the present disclosure provides a seat support 100j according to a tenth embodiment. The seat support 100j is similar to the seat support 100b in structure, and the differences between the two at least include: the seat support 100j does not include a second connecting member, and the first connecting member 2j is connected with the front seat assembly 202; the supporting member 11i has a receiving cavity 116j, the receiving cavity 116j is defined between inner layer 111j and the surface layer 112j and used to receive an airbag 117j, and the airbag 117j is provided with an air charging and discharging part 118j for inflating and deflating the airbag 117j.

Since the support portion 11i further includes an airbag 117j, when the support portion 11i and airbag 117i are placed on the seat cushion 2011 of the back seat assembly 201, the support portion 11i and airbag 117i can be stably placed on the seat cushion 2011 by their own gravity. In addition, user can further fix the support portion 11i and airbag 117j when sitting on the support portion 11i and airbag 117j.

Figure 19:
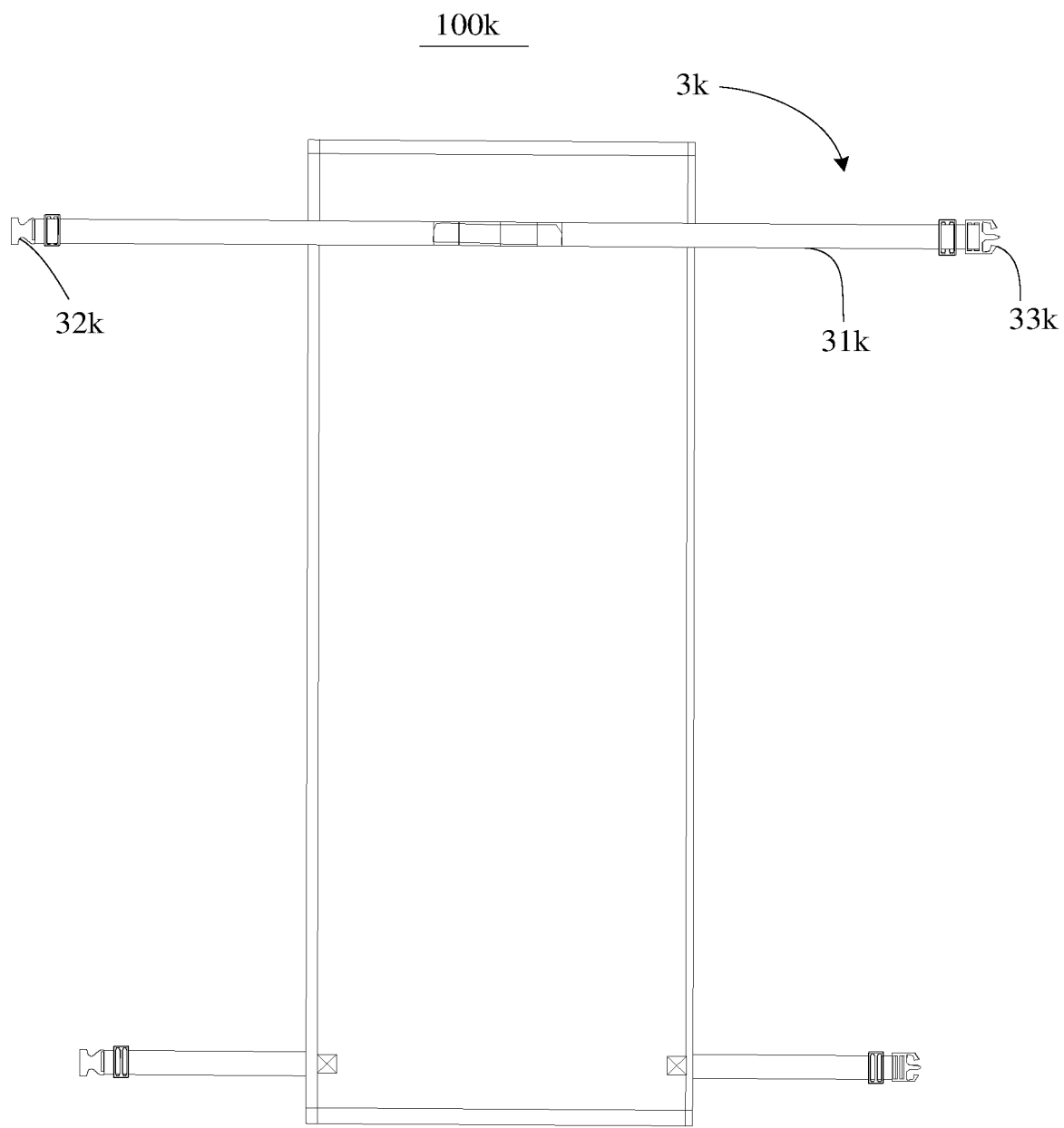
FIG. 19 is a structural diagram of a seat support according to an eleventh embodiment of the present disclosure.
Figure 20:
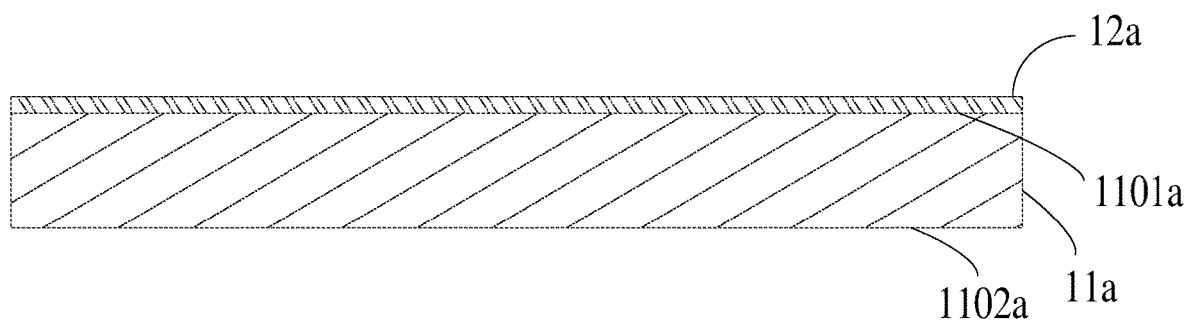
FIG. 20 is a structural diagram of an anti-skid portion and a support portion of the seat support in FIG. 1.

Referring to FIG. 19, the present disclosure provides a seat support 100k according to an eleventh embodiment. The seat support 100k is similar to the seat support 100c in structure, and the differences between the two at least include: the second connecting assembly 3k includes two connecting belts 31k, a connecting part 32k, and a connecting part 33k, the connecting belts 31k are connected with each other by the connecting part 32k and the connecting part 33k.

The above description is merely some embodiments. It should be noted that for one with ordinary skills in the art, improvements can be made without departing from the concept of the present disclosure, but these improvements shall fall into the protection scope of the present disclosure.

What is claimed is:

1. A seat support, applied to a vehicle having a front seat assembly and a back seat assembly, wherein the seat support comprises:
   a support member, comprising:
      a support portion, arranged on the back seat assembly; and
      an anti-skid portion, arranged on the support portion; and
   a first connecting member, arranged on the support portion and configured to connect the support portion with the front seat assembly; wherein
      the anti-skid portion is an anti-skid layer arranged on a back side of the support portion, and the anti-skid layer is made of an anti-skid material; or the anti-skid portion comprises a plurality of anti-skid bumps arranged on a back side of the support portion; wherein the anti-skid bumps are uniformly arranged on the back side; or the anti-skid bumps are randomly arranged on the back side; or each anti-skid bump has a diameter of about 0-200 mm; or each anti-skid bump has a height of about 0-20 mm; or a space between two adjacent anti-skid bumps is about 0-200 mm; or the anti-skid bump is made of plastic, silicone, or rubber; or the anti-skid bumps are arranged into a plurality of bump groups, diameters of bumps in each bump groups gradually decrease or increase in a direction from the back seat assembly to the front seat assembly, or heights of bumps in each bump groups gradually decrease or increase in a direction from the back seat assembly to the front seat assembly.

2. The seat support according to claim 1, wherein the first connecting member and the support portion cooperatively form a first connecting portion, the first connecting portion is connected with the front seat assembly.

3. The seat support according to claim 2, wherein the first connecting member comprises:
 a first connecting belt, connected with the support portion;
 a first connecting part; and
 a second connecting part, detachably connected with the first connecting part, two ends of the first connecting belt extending from the support portion are respectively connected with the first connecting part and the second connecting part, and the first connecting belt, the first connecting part, the second connecting part and the support portion cooperatively form the first connecting portion.

4. The seat support according to claim 1, wherein
 the first connecting member comprises a first covering portion, the first covering portion passes through the support portion, and the first covering portion is a one-piece structure.

5. The seat support according to claim 1, wherein further comprising:
 a second connecting member, configured to connect the support portion with the back seat assembly.

6. The seat support according to claim 5, wherein the second connecting member comprises:
 two seventh connecting belts;
 an eighth connecting part; and
 a ninth connecting part, detachably connected with the eighth connecting part, the two seventh connecting belts are respectively connected with the eighth connecting part and the ninth connecting part, the seventh connecting belt, the eighth connecting part, the ninth connecting part, and the support portion cooperatively form a third connecting portion.

7. The seat support according to claim 1, wherein the support portion comprises an inner layer and a surface layer connected with the inner layer, wherein
 the inner layer is connected to a periphery of the surface layer; or
 the inner layer is connected to a periphery of the surface layer, and connected to a middle portion of the surface layer; or
 the inner layer is made of cloth, fiber, paper cloth, polyurethane, or PVC flocking; or
 the surface layer is made of cloth, fiber, paper cloth, polyurethane, or PVC flocking; or
 a thickness of the surface layer is greater than that of the inner layer.

\* \* \* \* \*